128,403

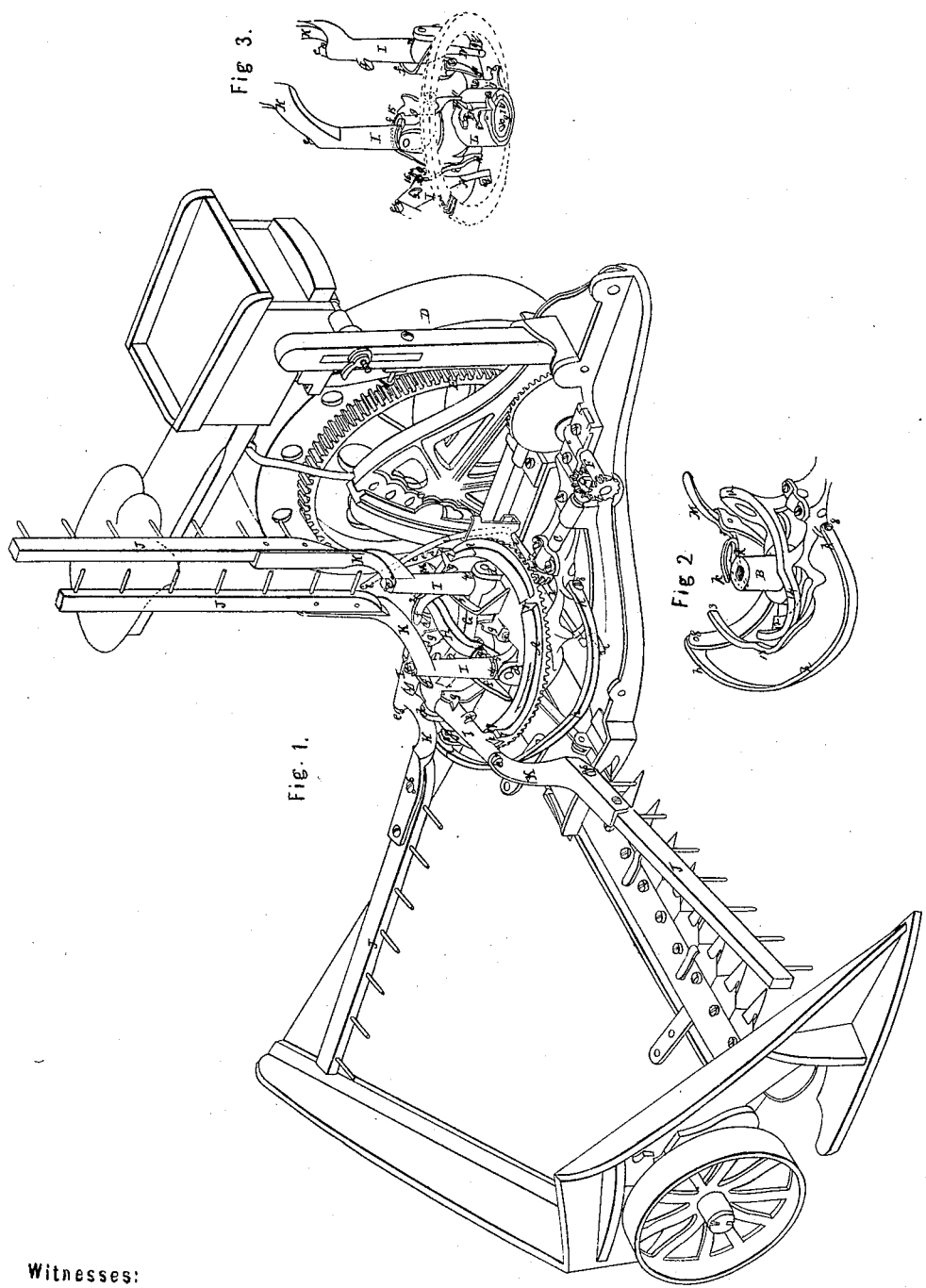

UNITED STATES PATENT OFFICE.

WILLIAM A. KIRBY, OF AUBURN, NEW YORK, ASSIGNOR TO HIMSELF AND DAVID M. OSBORNE, OF SAME PLACE.

IMPROVEMENT IN COMBINED RAKES AND REELS FOR HARVESTERS.

Specification forming part of Letters Patent No. 128,403, dated June 25, 1872.

*To all whom it may concern:*

Be it known that I, WILLIAM A. KIRBY, of Auburn, in the county of Cayuga and State of New York, have invented certain new and useful Improvements in a Combined Rake and Reel for Harvesting-Machines; and I do hereby declare the following to be a full, clear, and exact description of the construction and operation of the same, reference being had to the accompanying drawings making a part of this specification, in which—

Figure 1 represents a perspective view of a harvesting-machine known as the "Kirby," in which my combined rake and reel is shown as applied and operated; but may be applied and used on other machines. Figs. 2 and 3 represent perspective views of detached portions of the rake-and-reel mechanism, which are not clearly seen in Fig. 1.

Similar letters of reference, where they occur in the separate figures, denote like parts of the machine in all of the drawings.

My invention consists in a combined rake and reel, which is composed of a series of revolving and rising-and-falling arms, which can turn or roll upon their journals while revolving, and which can be used as rakes or beaters at the will of the operator, who may ride upon the machine.

To enable others skilled in the art to make and use my invention, I will proceed to describe the same with reference to the drawings, first premising that the machine itself is similar to that heretofore invented and patented by me, and need not be specially described, as it is fully shown in the drawings; nor do I confine my invention of the rake and reel to such a machine exclusively, as it may be applied to any other form or kind of harvesting-machine quite as well; and I so propose to apply and use it.

A cogged wheel, disk, or head, A, supported by its hub, 9, on a stem or post, B, is continuously revolved, when the machine is in motion, by the pinion *a* on the shaft C, said shaft being turned or driven from the main carrying and driving wheel D by or through the gear E, which meshes with a pinion on the end of the shaft F, and thus drives it. The opposite end of the shaft F has a bevel-gear, *b*, upon it, which works into a bevel-gear, *c*, on the shaft C, and thus said shaft C is driven, and in turn drives the wheel, disk, or head A. In bearings *d d* upon the wheel A, but remote from its center, are hung the crossed axles G H, which are bent at their line of crossing so that they may pass each other and still revolve, though hung in the same plane. Upon these cross-shafts are journals *e e*, set at right angles to each other, or thereabout, and also remote from the center of the wheel A, and upon these journals *e e*, thus located, the hubs I of the rake or reel arms are placed, and with them they revolve, and at the same time, upon them, they can roll, as will be hereafter explained, to make them act as rakes or beaters at the will of the operator, who rides on the machine. Upon each of the hubs I there are three studs or projections, 1 2 3. There is also a slot, 4, in each hub, through which a pin, 5, passes into its journal, and which pin and slot defines the extent of the rolling motion of the rakes or beaters, while the lugs, studs, or projections either aid in turning the rakes or beaters or prevent them from turning, as the case may be. Upon the wheel or disk A there are stationary curved cams or arms *f*, one for each rake or beater, which arms are placed at or near the heel of the rake or beater that it works in connection with. There are also upon the wheel or disk A four hinged or pivoted dogs, *g*, all alike, and one for each rake or beater. The arms *f* and the dogs *g* work in connection with the turning or holding of the rakes or beaters, as the case may be, and as will be hereafter explained. The rakes or beater-arms J are connected to their hubs I by a bent metallic shank, K, and are made adjustable on this metallic piece, so that the point of the rake may be raised or lowered by passing the rear screw 6 through a slot in the metal shank-piece K. There are also upon the upper side of the wheel or disk A four studs or projections, 7, which, when the arm they are opposite or nearest to is to act as a rake, aid to take the strain of the rake when it is removing a gavel from the platform. Underneath the wheel or disk A there are a series of cam-ways, shown in general in Fig. 2, which are fixed cam-ways; but there is hinged at the points 8 an adjustable or rising-and-falling cam, ledge, or rail *h*, over and against which the curved shanks K of the beaters move, and by which, through a bent lever, $i$, extending up to within convenient reach of the driver or operator, the said beaters may be raised up individually, or in their series capacity as such, while they are in motion, or lowered, as circumstances may require, to move them further from or nearer to the platform. The arm that acts as a rake—not touching this hinged cam-way $h$, but dropping beyond it—is not influenced by it as a rake, so that the beaters may be raised or lowered while in motion; but the rake maintains a uniform motion, and does not rise. Though the arms are all alike, hung alike, and can be operated alike, yet when any one of the series becomes a rake it moves in a uniform unchangeable path; but whenever again that same arm becomes a beater it can be raised or lowered in parallel or horizontal planes at pleasure, while the one that acts, for the time being, as a rake takes and moves in the unchangeable path. Upon the stem or post B, or rather over it, and over the hub 9 of the wheel A, is placed a sleeve or hub, L, Fig. 3, which sleeve L has upon it a hinged dog, $j$, the point or nose of which, projecting through said sleeve, will, if not otherwise controlled, pass into one of a series of four holes, 10, in the hub 9—two of the holes (10) only are seen in the drawings, Fig. 3; but there are four—one for each of the rakes or beaters, whatever that number may be. So long as the nose of the dog $j$ thus unites the sleeve and hub they will revolve together and with the wheel A, and the particular rake or arm that the hole it occupies represents will continue to work as a rake, while all the others will act as beaters.

To stop the rake from working, or to allow any other of the series that have been acting as beaters to change, come in, and act as a rake, I arrange as follows: A forked latch, $k$, Fig. 2, is arranged on a hinged lever, M, which lever may be attached to the stationary cam-way or to the main frame, or any other permanent part of the machine, and extending into a position where the driver, with his foot or otherwise, may control and operate it. When the arm that has been acting as a rake is to be thrown out the forked latch $k$ is raised up, and when the dog $j$ comes around its tail-piece $l$ passes in between the forks, and its contact therewith draws out the nose of the dog, disconnecting the sleeve L and hub 9, and holding the sleeve still, while the hub, with the wheel A, continues to revolve. When this is done, and so long as the latch $k$ is held up, all of the arms will act as beaters or as a reel, and no raking will be done. When one of the arms—any one of them—is to act as a rake the forked latch is dropped by the driver removing his foot or otherwise from the lever, and the nose of the dog $j$ will take the first hole in the hub 9 that comes opposite to it and again unite the two hubs or sleeve and hub, and the arm represented by that hole will act as a rake, so that the operator can let one arm of a series act as a rake constantly, or throw it out and again let it or any other one in as he pleases. So long as the latch is down the tail of the dog $j$ will pass it without touching, and consequently no change in the raking and reeling will occur; but when enough straw has not accumulated to make a proper-sized gavel on the platform, then the rake may be thrown out and no raking done, or another arm let in as a rake when enough has accumulated. There is upon the sleeve L a pivoted dog, $m$, having two arms, $n\ o$, upon it, one at its upper end and the other at its lower end, the upper, $n$, taking against the lower ends 11 of the series of pivoted dogs or arms $g$, (one for each rake, arm, or beater,) which dogs or arms are pivoted on and move with the wheel A, as heretofore described, to turn such of the arms as act as beaters, but which allows the one acting as a rake to pass without turning; and the lower arm $o$ traverses or moves in a cam-way, 12, which turns the dog $m$ and moves the upper arm into its proper working position at that part of its rotation. The position of this dog $m$ defines the one of the series that acts as a rake, but has nothing to do with those of the series that act as beaters. Its function is to make any one of the series of arms a rake. On each of the rake-axles G H, and for the rakes of each of the axles, there are bent arms N, which project below the wheel A, and upon the end of each there is a friction-roll, $q$, which runs upon the top of the cam-way 14 and underneath the cam-way 13 as they move around, so as to aid in giving proper position to the rakes or beaters when passing that part of their circuit. When the arm that is to act as a rake arrives at or near where the beaters are turned to make them act as a reel, and as shown at 15 in Fig. 3, the dog $g$ is thrown up against the point of the stationary curved or cam-piece $f$ by means of the projection $o$, which, in its cam-way, turns the dog $m$, and thus causes the projection $n$ to bear against the lower end 11 of the dog $g$ and move its upper end to and against the cam-piece $f$, so that the two pieces $f\ g$ form a continuous bearing for the rake, and prevent it from turning or rolling on its journal. When a beater-arm comes around, instead of the dog taking against the piece $f$ it catches upon its shoulder (as seen at 16) the projection 3 upon the rake-hub I and holds it so that the projection 1 will rest upon or move over the projection 7 on the wheel A; and by not coming against said projection the beater can turn or roll upon its journal and act as a reel; and as the beaters are rolled into action their teeth are turned back so as not to catch or move the grain on the platform, and are free to yield or roll should any straw or tangled grain catch in the teeth. The different relations of the dog and cam-piece, to allow the arm to act as a beater and as a rake, are shown, respectively, at 16 and 17. The object of the lug 1 on the raking-arm taking alongside of the lug or projection 7 on the wheel is to sustain the rake and take the strain from its center of motion. The arm that acts as a rake, not turning upon its journal, passes beyond, in dropping, the hinged cam-rail $h$, and is in nowise influenced by it, and could not be raised by it, as the rake should not and does not rise as it passes over the platform. The beaters, however, owing to their position and the manner in which they turn or roll, bring their curved shanks upon the hinged cam-way, and they ride along upon it, and thus the beaters can be raised or lowered at pleasure by the driver either to pass over the grain on the platform or to flatten it down by gently pressing upon it; and in rising or falling the beaters always maintain the same horizontality, a thing they could not do if simply hinged at one end and rising and falling upon the hinge-joint. The wheel, head, or disk A revolves in the direction of the red arrow thereon; but the rake and beaters drop into action in a direction contrary to that of the wheel. The rake, when at or about the line of the cutters, is in the same plane with its journal; but the beaters, when they arrive at that line, are in rear of the plane of their journals.

Having thus fully described my invention, what I claim therein as new, and desire to secure by Letters Patent, is—

A combined rake and reel, which is composed of a series of revolving and rising-and-falling arms, which can turn or roll upon their journals while revolving, and which can be used as rakes or beaters at the will of the operator, who may ride on the machine, substantially as described.

WM. A. KIRBY.

Witnesses:
A. B. STOUGHTON,
EDM. F. BROWN.